United States Patent [19]

Konno et al.

[11] Patent Number: 5,304,438
[45] Date of Patent: Apr. 19, 1994

[54] CHARGE IMAGE RECORDING MEDIUM

[75] Inventors: Toshio Konno, Yokohama; Tadayuki Shimada, Yokosuka; Atsushi Nakano, Yokohama, all of Japan

[73] Assignee: Victor Company of Japan, Ltd., Yokohama, Japan

[21] Appl. No.: 915,388

[22] Filed: Jul. 20, 1992

Related U.S. Application Data

[63] Continuation of Ser. No. 538,068, Jun. 14, 1990, abandoned.

Foreign Application Priority Data

Jun. 16, 1989 [JP] Japan .................. 1-153761
Jun. 16, 1989 [JP] Japan .................. 1-153762

[51] Int. Cl.$^5$ .............................................. C09K 19/00
[52] U.S. Cl. ...................................... 430/20; 430/341; 359/51; 359/79
[58] Field of Search ................ 430/20, 341; 428/1; 359/74, 104–105, 246, 106, 51, 101

[56] References Cited

U.S. PATENT DOCUMENTS

| | | |
|---|---|---|
| 3,849,188 | 11/1974 | Suzuki et al. |
| 3,891,990 | 6/1975 | Wells ..................... 430/20 |
| 3,935,337 | 1/1976 | Taylor .................... 427/180 |
| 4,675,699 | 1/1987 | Kan et al. |
| 4,831,452 | 5/1989 | Takanashi et al. .......... 258/225 |
| 4,956,713 | 9/1990 | Takanashi et al. .......... 358/217 |
| 4,971,719 | 11/1990 | Vaz et al. ................. 428/1 |
| 5,011,624 | 4/1991 | Tamagishi et al. ........... 428/1 |

FOREIGN PATENT DOCUMENTS

| | | |
|---|---|---|
| 3324770 | 1/1984 | Fed. Rep. of Germany . |
| 3727945 | 2/1988 | Fed. Rep. of Germany . |
| 55-50250 | 4/1980 | Japan . |
| 55-81348 | 6/1980 | Japan . |
| 55-110254 | 8/1980 | Japan . |
| 61-204665 | 9/1986 | Japan . |
| 62-148967 | 7/1987 | Japan . |
| 63-279442 | 11/1988 | Japan . |

*Primary Examiner*—Thorl Chea
*Attorney, Agent, or Firm*—Lowe, Price, LeBlanc & Becker

[57] ABSTRACT

A charge image recording medium (RM) comprising a lamination of an electrode (E) and at least one of a light-modulation material layer (PMLQ) and an insulating polymer film or dielectric layer (IL), wherein said light-modulation material layer (PMLQ) comprises a polymer-dispersed liquid crystals film comprising a liquid crystal dispersed in a polymer. The insulating polymer film (IL) may be provided thereon with a thin film (CL) of a fatty acid or a thin film (CL) of a metal salt of a fatty acid.

The light-modulation material layer (PMLQ) comprising a polymer-dispersed liquid crystals film comprising a liquid crystal dispersed in a polymer may also be provided thereon with a thin film (CL) of a fatty acid or a thin film (CL) of a metal salt of a fatty acid.

12 Claims, 4 Drawing Sheets

CHARGE IMAGE RECORDING MEDIUM

This application is a continuation application of application Ser. No. 07/538,068, filed Jun. 14, 1990, now abandoned.

BACKGROUND OF THE INVENTION

1. Field of the Invention

This invention relates to a charge image recording medium.

2. Description of the Prior Art

In recent years, a number of imaging devices based on a process using the latent image of electron-charge have been proposed that offer the hope of practical usefulness in image picking-up, image recording, image reproducing and image displaying. An example of such devices is disclosed in U.S. Pat. application Ser. No. 301,324 (filed on Jan. 24, 1989, a C.I.P. of U.S. Ser. No. 139,005), in which an optical image inputted is converted to a latent image of electron-charge, recorded on a recording medium and reproduced. The mechanisms for recording and reproducing, and an example of media proposed in this reference, are illustrated in FIGS. 8, 9 and 5, respectively.

A writing head WH or a reading head RH are necessary for operating the recording and reproducing of a charge image by the use of a charge image recording medium, as will be described later in detail with reference to FIGS. 8 and 9. Use of a light-modulation material at the part having the function of retaining a charge image in a charge image recording medium RM (i.e., a dielectric layer IL in the charge image recording medium RM illustrated in FIGS. 6 and 9) makes a reading head unnecessary at the time of reading. Hence, a recording medium comprising a lamination of an electrode and a layer (a light-modulation material layer) comprised of a light-modulation material is often used as the charge image recording medium RM.

However, since a recording medium may have a great variety of forms as exemplified by a tape, a disk, a sheet and a card, it has not been easy to construct the light-modulation material layer on the charge image recording medium that may have various forms. In particular, it has been difficult to construct the light-modulation material layer on a charge image recording medium having a large area or a charge image recording medium having the form of a tape.

The above difficulty also applies in the case when the light-modulation material used in constituting a light-modulation material layer comprises, for example, a liquid crystal or lithium niobate.

When the part at which a charge image is recorded is constituted of a dielectric layer IL, a charge image can be well recorded in a highly detailed state. In a conventional charge image recording medium RM, however, the charges of a charge image recorded thereon may gradually decrease with lapse of time and it has occurred even that the charge image can be retained only for several hours to several days or so. Thus, it has been sought to provide a charge image recording medium capable of storing a charge image for a long period of time.

SUMMARY OF THE INVENTION

An object of the present invention is to solve the problems as discussed above.

The object of the present invention can be achieved by a charge image recording medium comprising a lamination of an electrode and at least one of a light-modulation material layer and an insulating polymer film (a dielectric layer), wherein said light-modulation material layer comprises a polymer-dispersed liquid crystals film comprising a liquid crystal dispersed in a polymer. The insulating polymer film may be provided thereon with a thin film of a fatty acid or a thin film of a metal salt of a fatty acid.

The above light-modulation material layer comprising a polymer-dispersed liquid crystals film comprising a liquid crystal dispersed in a polymer may also be provided thereon with a thin film of a-fatty acid or a thin film of a metal salt of a fatty acid.

DESCRIPTION OF THE PREFERRED EMBODIMENTS

Figure 1:
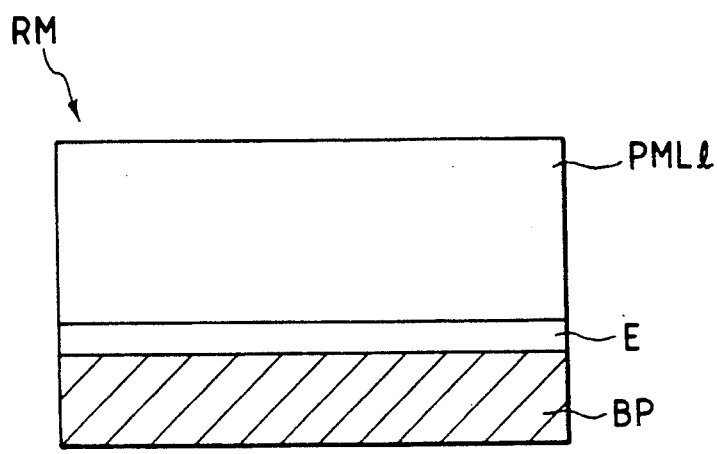
FIGS. 1 to 4 are side views of different examples of the charge image recording medium of the present invention.

According to a first embodiment of the present invention, the charge image recording medium comprises a lamination of an electrode E and a light-modulation material layer PMLQ, as shown in FIG. 1, and said light-modulation material layer PMLQ comprises a polymer-dispersed liquid crystals film comprising a liquid crystal dispersed in a polymer.

A charge image to be recorded is retained in the polymer-dispersed liquid crystals film laminated on the electrode (a transparent electrode), and an electric field with an intensity distribution corresponding to the charge image is applied to the polymer-dispersed liquid crystals film. Hence, a nematic liquid crystal in the polymer-dispersed liquid crystals film that constitutes the light-modulation material layer PMLQ comes to have an optical axis of its molecule in the direction perpendicular to the transparent electrode, and changes the state of transmission of light.

Read-out light may be shot on the polymer-dispersed liquid crystals film used as the light-modulation material layer, so that the read-out light thus shot passes through the polymer-dispersed liquid crystals film of the light-modulation material layer PMLO, and turns to be light which is in the state wherein the amount of light has changed according to the charge image. Thus, optical image information can be read.

Figure 2:
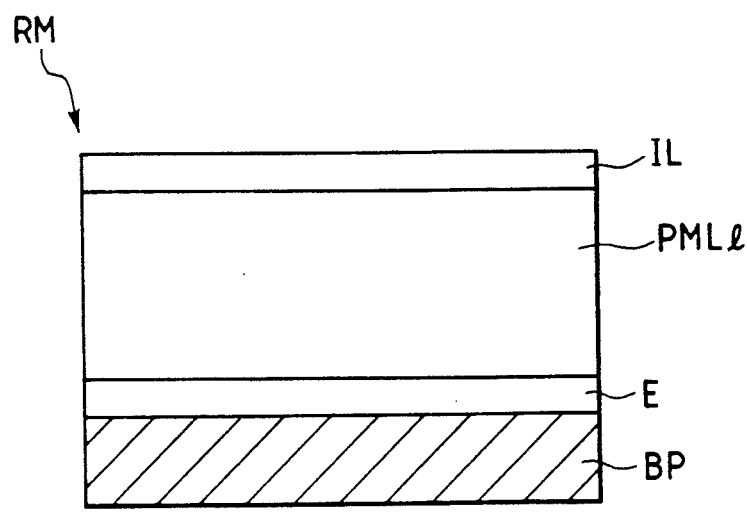

In the first embodiment of the present invention, the charge image recording medium may comprise a lamination of an electrode E, a light-modulation material layer PMLQ and a dielectric layer IL (insulating polymer film), as shown in FIG. 2, and said light-modulation material layer comprises the polymer-dispersed liquid crystals film comprising a liquid crystal dispersed in a polymer.

Figure 3:
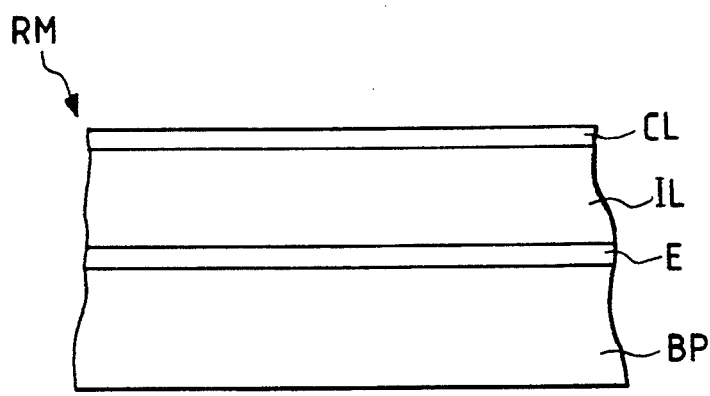
Figure 4:
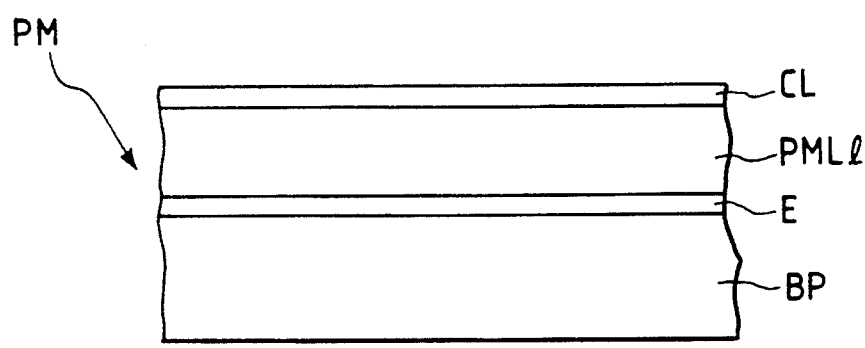

According to a second embodiment of the charge image recording medium of the present invention, the charge image recording medium comprises a lamination of an electrode E and an insulating polymer film IL (a dielectric layer) or a light-modulation material layer PMLQ, as shown in FIG. 3 or 4, and the insulating polymer film IL, or the light-modulation material layer PMLQ (which comprises a polymer-dispersed liquid crystals film comprising a liquid crystal dispersed in a polymer), is provided thereon with a thin film CL of a fatty acid or a thin film CL of a metal salt of a fatty acid.

The thin film CL of a fatty acid or the thin film CL of a metal salt of a fatty acid may also be provided on the lamination shown in FIG. 2.

The thin film of a fatty acid or the thin film of a metal salt of a fatty acid, provided on the insulating polymer film or the light-modulation material layer comprising the polymer-dispersed liquid crystals film comprising a liquid crystal dispersed in a polymer, has a good water-repellent effect, so that a charge image formed on the thin film of a fatty acid or the thin film of a metal salt of a fatty acid can be retained over a longer period of time.

The charge image recording medium of the present invention will now be described below in detail with reference to the accompanying drawings.

In the charge image recording medium of the present invention shown in FIGS. 1 and 2, BP denotes a substrate; E, a transparent electrode comprising, for example, an ITO film; and PMLQ, a polymer-dispersed liquid crystals film used as a light-modulation material layer in which the state of transmission of light is changed according to the intensity distribution of an electroic field applied. In FIG. 2, IL denotes a dielectric layer (an insulating polymer film).

In the charge image recording medium of the present invention shown in FIGS. 3 and 4, BP denotes a substrate; E, a transparent electrode comprising, for example, an ITO film; and CL, a thin film (a coat layer CL) of a fatty acid or a thin film of a metal salt of a fatty acid. In FIG. 3, IL denotes an insulating polymer film (a dielectric layer). In FIG. 4, PMLQ denotes a light-modulation material layer employing a polymer-dispersed liquid crystals film.

As the above substrate BP, suitable polymers can be used. In the case when the charge image recording medium is constituted as a medium of a transmission type, a material transparent to the read-out light is used in the substrate BP. In the case when the charge image recording medium is constituted as a medium of a reflection type, in other words, when the charge image recording medium is equipped with a dielectric mirror so that the read-out light can travel forward and back through the polymer-dispersed liquid crystals film used as a light-modulation material layer, a material opaque to the read-out light may be used as the substrate BP.

The polymer-dispersed liquid crystals film used as the light-modulation material layer PML-Q is comprised of a polymer having a volume resistivity of not less than $10^{14}$ Ω·cm and, dispersed therein, a nematic liquid crystal that exhibits a liquid crystal phase at room temperature and has a volume resistivity of as high as not less than $1 \times 10^{13}$ Ω·cm. Such a polymer includes, for example, methacrylic resins, polyester resins, polycarbonate resins, vinyl chloride resins, polyamide resins, polyethylene resins, polypropylene resins, polystyrene resins, and silicone resins.

As the dielectric layer IL as shown in FIG. 2, a thin film comprising a polymer-having a volume resistivity of not less than $10^{14}$ Ω·cm may also be used. Such a polymer includes, for example, methacrylic resins, polyester resins, polycarbonate resins, vinyl chloride resins, polyamide resins, polyethylene resins, polypropylene resins, polystyrene resins, and silicone resins.

Materials that can be used as the insulating polymer film (dielectric layer) IL in the charge image recording medium RM as shown in FIG. 3 include, for example, acetate, polyethylene, polypropylene, vinyl chloride, vinylidene chloride, polystyrene, polycarbonates, polyesters, ethylene tetrafluoride, polyvinyl fluoride, polyimides, an ethylene/vinyl acetate copolymer, polymethyl methacrylate, acrylonitrile, a styrene copolymer, polyurethanes, polyvinyl butyral, poly-4-methylpentane, epoxy resins, phenol resins, diallyl phthalate resins, silicone resins, polyvinylidene fluoride, polytrifluoroethylene, polytetrafluoroethylene, polyether imide, polysulfone, polyacrylate, isoprene rubber, styrene-butadiene rubber, butadiene rubber, ethylene-propylene rubber, butyl rubber, cellulose triacetate, acetylbutylcellulose, ABS resins, polybutene-1, a methyl methacrylate/styrene copolymer, and a maleic anhydride/styrene copolymer.

The polymer-dispersed liquid crystals film used as the light-modulation material layer PMLQ described above can be prepared according to the examples as described below.

EXAMPLE (1)

A room-temperature nematic liquid crystal E-44, a product of BDH Co., Great Britain, is weighed in an amount of 3 g. The nematic liquid crystal E-44 thus weighed is added to a chloroform 10% solution of 20 g of PMMA, and the mixture is stirred and then left to stand.

A substrate BP on which an ITO film has been formed as a transparent electrode E is thoroughly cleaned. The chloroform solution of PMMA, containing the liquid crystal and having been left to stand, is coated using a bar coater on the transparent electrode E comprising the ITO film formed on the substrate BP. A light-modulation material layer PMLV comprising a polymer-dispersed liquid crystals film is thus formed.

In addition to the above PMMA, any materials can be used as the polymer so long as it dissolves in a solvent, can be coated in the form of a film, and is a polymer having a high volume resistivity. In particular, polycarbonate, PEI, etc., having a good transparency, can be preferably used. In this regard, the same applies in other Examples (2) and (3).

EXAMPLE (2)

A room-temperature nematic liquid crystal LIXON5017 (or LIXON5028), a product of Chisso Corporation, is weighed in an amount of 3 g. The nematic liquid crystal LIXON5017 (or LIXON5028) thus weighed is added to a 10 wt.% chloroform solution of 20 g of PMMA, and the mixture is stirred and then left to stand.

A substrate BP on which an ITO film has been formed as a transparent electrode E is thoroughly cleaned. The chloroform solution of PMMA, containing the liquid crystal and having been left to stand, is coated in a thickness of 8 microns using a bar coater, on the transparent electrode E comprising the ITO film formed on the substrate BP. A light-modulation material layer PMLQ comprising a polymer-dispersed liquid crystals film is thus formed.

EXAMPLE (3)

A room-temperature nematic liquid crystal ZLI4277, a product of Merck Japan Limited, is weighed in an amount of 3 g. The nematic liquid crystal ZLI4277 thus weighed is added to a 10 wt.% chloroform solution of 20 g of PMMA, and the mixture is stirred and then left to stand.

A substrate BP on which an ITO film has been formed as a transparent electrode E is thoroughly cleaned. The chloroform solution of PMMA, containing the liquid crystal and having been left to stand, is coated in a thickness of 8 microns using a bar coater, on the transparent electrode E comprising the ITO film formed on the substrate BP. A light-modulation material layer PMLQ comprising a polymer-dispersed liquid crystals film is thus formed.

The above polymer-dispersed liquid crystals film comprising a polymer dispersed in a liquid crystal can be readily formed into a film with a large area, and hence the charge image recording medium of the present invention can be more readily prepared than conventional charge image recording media.

The nematic liquid crystals used in the preparation examples (2) and (3) among the preparation examples (1) to (3) described above have a specific resistivity of as high as not less than $1 \times 10^{13} \Omega \cdot cm$. Hence, the charge image recording medium provided with the light-modulation material layer PMLQ comprising the polymer-dispersed liquid crystals film prepared using a material with a volume resistivity of not less than $10^{14}$ as the polymer in which the liquid crystal is dispersed, makes it possible to write and read image information with a high resolution.

More specifically, when a liquid crystal with a low volume resistivity is used because of a number of ions contained therein, in the light-modulation material layer comprised of a polymer-dispersed liquid crystals film, the ions contained in the liquid crystal migrate as a result of the application of a magnetic field to the light-modulation material layer, to lower the intensity of an electric field attributable to a charge image imparting an electric field to the light-modulation material layer. For this reason, the inclination of an optical axis of a liquid crystal molecular is decreased. The decrease in the inclination of an optical axis of a liquid crystal molecule results in a disturbance of the electric field attributable to the charge image. However, in the charge image recording medium provided with the light-modulation material layer PMLQ comprising the polymer-dispersed liquid crystals film prepared using the nematic liquid crystal as used in the above examples (2) and (3), having a resistivity of as high as not less than $1 \times 10^{13} \Omega \cdot cm$, and the material with a volume resistivity of not less than 10 as the polymer in which the liquid crystal is dispersed, the liquid crystal does not contain ions in a large quantity and hence the ions do not behave in the unfavorable way as stated above. Thus, it becomes possible to read and write image information with a high resolution.

The thin film CL of a fatty acid or the thin film CL of a metal salt of a fatty acid, provided on the insulating polymer film (dielectric layer) IL in the charge image recording medium of the present invention as shown in FIG. 3, and the thin film CL of a fatty acid or the thin film CL of a metal salt of a fatty acid, provided on the light-modulation material layer PMLQ comprising a polymer-dispersed liquid crystals film in the charge image recording medium of the present invention as shown in FIG. 4, may be formed using, for example, a thin film of a fatty acid such as stearic acid, arachidic acid, myristic acid, pentadecyl acid, or a thin film of a metal salt of any of these acids.

The thin film CL of a fatty acid or a metal salt of a fatty acid can be formed by the methods as exemplified below.

METHOD (1)

A molten salt of iron (III) stearate is coated on the insulating polymer film IL or the light-modulation material layer PMLQ comprising a polymer-dispersed liquid crystals film, of the charge image recording medium RM of the present invention as shown in FIG. 3 or 4. Thereafter, an excess molten salt of iron (III) stearate is rubbed out using cloth or the like. As a result, a coat layer CL of iron (III) stearate is formed with a thickness of several ten angstroms, on the insulating polymer film IL or the light-modulation material layer PMLQ comprising a polymer-dispersed liquid crystals film.

METHOD (2): LB (Langmuir-Brodgett) process

Potassium hydrogencarbonate ($KHCO_3$) is added to ultra-pure water, and the pH is adjusted to 6.4. $CdCl_2$ is added to the resulting mixture to prepare an aqueous $1.0 \times 10^{-3}$ mol/Q solution. This is used as a subphase.

Next, a chloroform solution of stearic acid obtained by repeating thorough purification is spread over the above subphase. After the solvent is confirmed to have been evaporated, the spread solution is slowly compressed using a barrier until its surface pressure reaches 30 dyne/cm.

At the stage where the surface pressure has reached 30 dyne/cm, Y-films of cadmium stearate are built up in four-layer structure on the insulating polymer film IL or the light-modulation material layer PMLQ comprising a polymer-dispersed liquid crystals film in the charge image recording medium RM of the present invention as shown in FIG. 3 or 4. A coat layer CL is thus formed.

Figure 6:
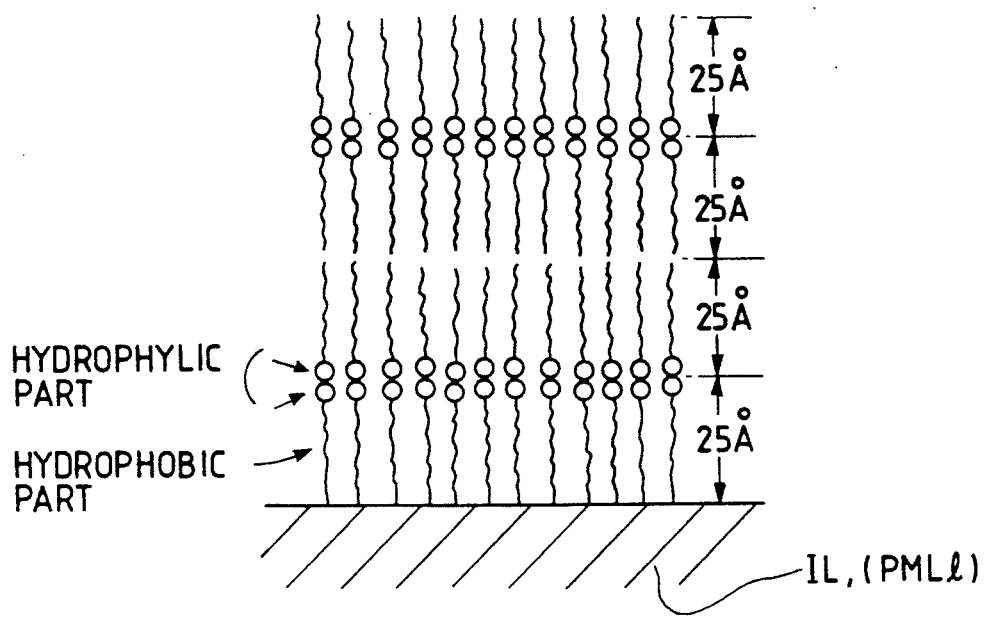
FIG. 6 illustrates Y-films prepared by the LB process.

FIG. 6 diagramatically illustrates the Y-films of cadmium stearate thus built up in four-layer structure.

Incidentally, the charge image recording medium obtained by forming the coat layer CL of iron (III) stearate with a thickness of several ten angstroms by the above method (1) on the insulating polymer film IL or the light-modulation material layer PMLQ- comprising a polymer-dispersed liquid crystals film, was positively charged to 889 V using a corona charger, and thereafter it was examined how the potential decreases with lapse of time. As a result, it was revealed that the surface potential of the resulting charge image recording medium decreased in the state as shown in FIG. 7.

Figure 5:
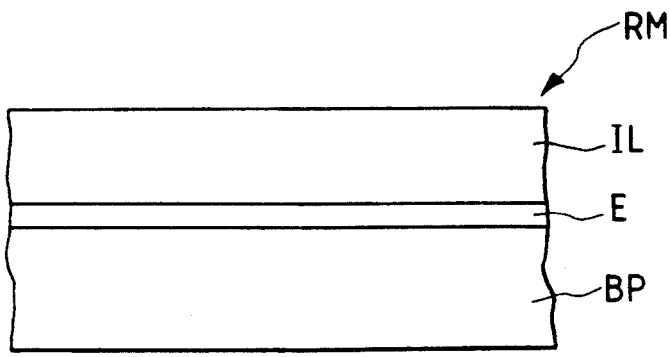
FIG. 5 is a side view of a conventional charge image recording medium.
Figure 7:
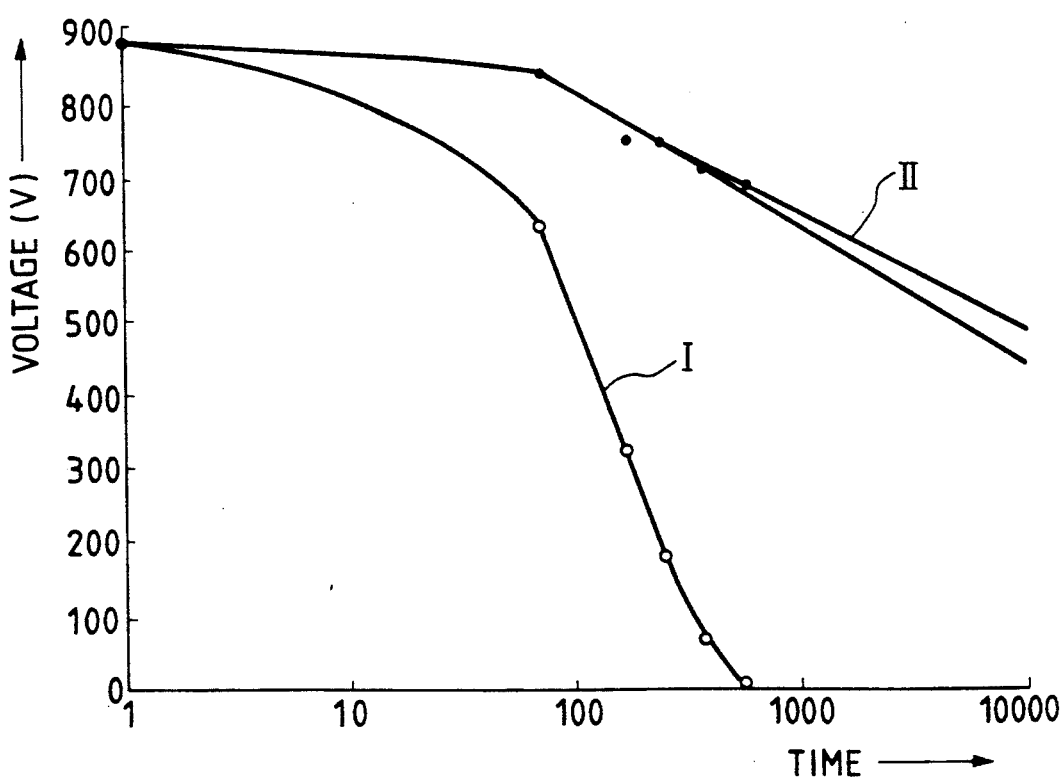
FIG. 7 is a graph to show charge retension characteristics.

In FIG. 7, the curve I shows the state of the decrease in surface potential with lapse of time after a conventional charge image recording medium (see FIG. 5), provided with no coat layer CL using a molten salt, on the insulating polymer film IL in the charge image recording medium RM, has been positively charged to 889 V using a corona charger. It is seen from the comparison between curves I and II in FIG. 7 that the charge image recording medium RM of the present invention, i.e., the charge image recording medium provided with the coat layer CL using a molten salt, on the insulating polymer film IL or the light-modulation material layer PMLQ comprising a polymer-dispersed liquid crystals film, can retain a charge image over a very long period of time compared with the conventional charge image recording medium (see FIG. 5).

The charge image recording medium obtained by forming the coat layer CL comprising Y-films of cadmium stearate, built up in four-layer structure by the above method (2) on the insulating polymer film IL or the light-modulation material layer PMLQ comprising a polymer-dispersed liquid crystals film in the charge image recording medium RM of the present invention as shown in FIG. 3 or 4 was also positively charged to 889 V using a corona charger, and thereafter it was examined how the potential decreases with lapse of time. As a result, a good effect was obtained such that the surface potential of the resulting charge image recording medium less decreased than the decrease in surface potential with lapse of time in the case of the charge image recording medium obtained by forming the coat layer CL of iron (III) stearate with a thickness of several ten angstroms by the method (1) described above on the insulating polymer film IL or the light-modulation material layer PMLQ comprising a polymer-dispersed liquid crystals film.

As described above, the charge retension time can be made very longer in the case when the coat layer CL of a fatty acid or a metal salt of a fatty acid is formed on the insulating polymer film IL or the light-modulation material layer PMLQ comprising a polymer-dispersed liquid crystals film in the charge image recording medium RM of the present invention, than in the case when the charge image recording medium is provided with no coat layer CL of a fatty acid or a metal salt of a fatty acid. This is presumed to be due to the water repellency attributable to the coat layer CL of a fatty acid or a metal salt of a fatty acid.

The charge image recording medium of the present invention can be used, for example, in the following recording and reproducing systems.

Figure 8:
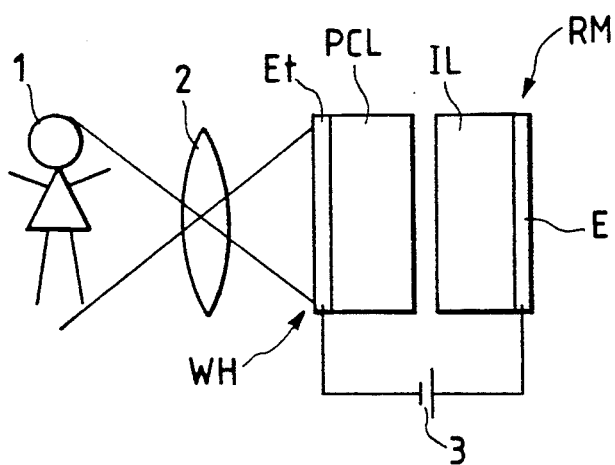
FIG. 8 is a block diagram to illustrate an example of the constitution of a recording system that records as a charge image the information to be recorded and reproduced.

FIG. 8 is a block diagram to illustrate an example of the constitution of a recording system that records as a charge image the information to be recorded and reproduced, using a charge image recording medium. In FIG. 8, the numeral 1 denotes an object; 2, a camera lens; 3, an electric source; WH, a writing head comprised of a lamination of an electrode Et and a photoconductive layer member PCL; and RM, a charge image recording medium comprised of a lamination of an dielectric layer IL and an electrode E as previously described, corresponding to an embodiment in which a charge image is recorded on the dielectric layer IL (The same applies in FIG. 9).

The above electrodes Et and E can be formed using, for example, a thin film made of a metal or an electroconductive film made of $SnO_2$ (trade name: NESA). The photoconductive layer member PCL can be formed using a thin film made of a suitable photoconductive material.

In the recording system as shown in FIG. 8, a cathode of the electric source 3 is connected to the transparent electrode Et in the writing head WH. An anode of the electric source 3 is also connected to the electrode E of the charge image recording medium RM. Once an optical image of the object 1 is formed on the photoconductive layer member PCL of the writing head WH though the camera lens 2, the electrical resistivity of the photoconductive layer member PCL changes according to the optical image of the object 1.

Since as described above the electric source 3 is connected between the transparent electrode Et in the writing head WH and the electrode E in the charge image recording medium RM, the above change in electrical resistivity of the photoconductive layer member in accordance with the formed optical image of the object 1 brings about a change in voltage between the photoconductive layer member PCL in the writing head WH and the dielectric layer IL in the charge image recording medium RM in accordance with the optical image of the object 1.

Then, the charge image formed on the dielectric layer IL in the charge image recording medium RM corresponds to the optical image of the above object 1 as a result of the discharge taking place between the photoconductive layer member PCL in the writing head WH and the dielectric layer IL in the charge image recording medium RM.

The reading of charge image information from the charge image recording medium RM in which a charge image corresponding to the information serving as an object to be recorded has been recorded using, e.g., the recording system as described with reference to FIG. 8., can be carried out using, for example, an electrical information-reading means or an optical information-reading means.

Figure 9:
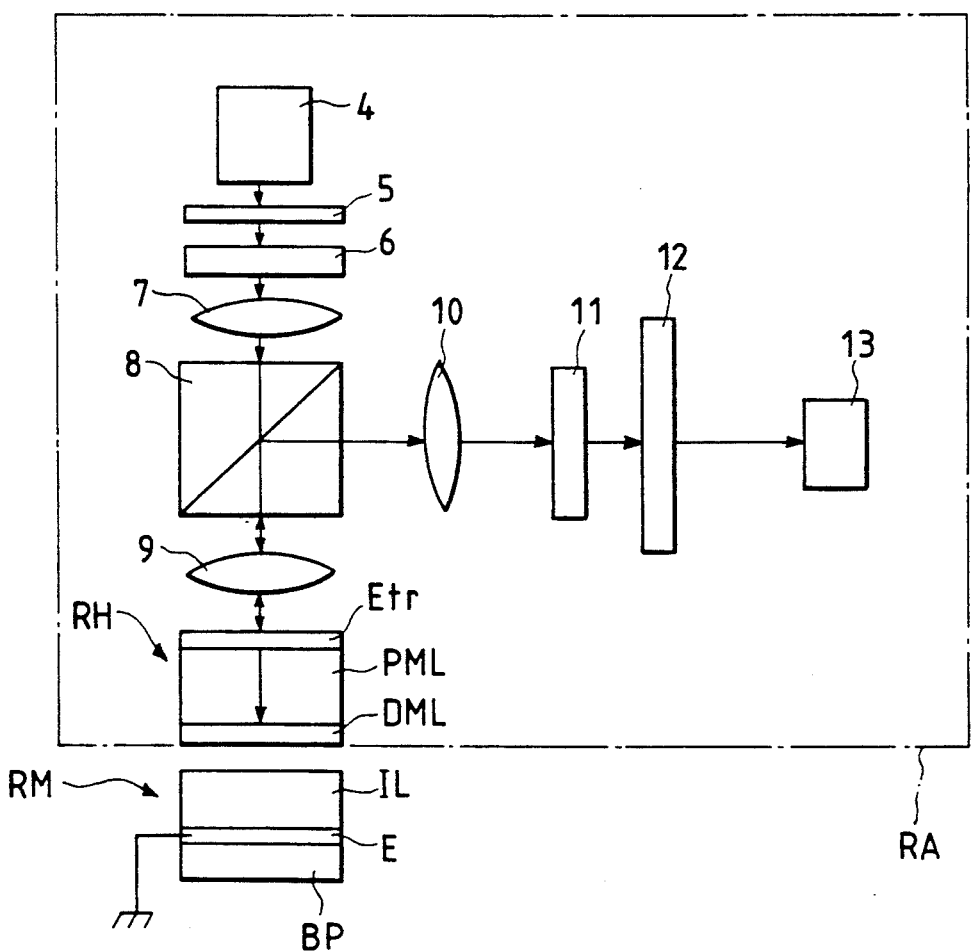
FIG. 9 is a block diagram of a reproducing system.

In the case when the reading of charge image information from the above charge image recording medium RM is carried out using an optical information-reading means, the information is read in the manner as exemplified in FIG. 9, using a charge image information-reading device (a reading head) RH comprised of a light-modulation material capable of varying the state of light depending on the intensity of an electric field applied.

FIG. 9 illustrates an example of the constitution of an optical information-reading apparatus RA in which the charge image information is read from the charge image recording medium RM through an optical information-reading means. In FIG. 9, BP denotes a substrate of a charge image recording medium RM; E, an electrode of the charge image recording medium; and IL, a dielectric layer of the charge image recording medium RM. A dielectric mirror DML in the charge image information-reading device (a reading head) RH is positioned at the part facing the surface of the dielectric layer IL of the above charge image recording medium RM.

The reading head RH as shown in FIG. 9 is equipped with, for example, a dielectric mirror DML on one surface of a light-modulation material layer PML (e.g., a layer of a material used for light-modulation, as exemplified by a layer of lithium niobium or twisted nematic liquid crystal, having an electro-optic effect) having properties such that the state of light can be varied according to the applied voltage, and also provided on the other side thereof with a transparent electrode Etr.

To the surface of the dielectric mirror DML of the reading head RH as shown in FIG. 9, the surface of the dielectric layer IL in the charge image recording medium RM is brought close so that the electric field of the charge image formed on the dielectric layer IL can be imparted to the light-modulation material layer PML of the reading head RH. Light is also passed from the transparent electrode Etr of the reading head RH toward the other surface of the light-modulation material layer PML through, so that the light passes through the light-modulation material layer PML and is reflected on the dielectric mirror DML, and then the reflected light again passes through the light-modulation material layer PML and emerges from the transparent electrode Etr on the side the light has been made incident.

The state of the light having emerged from the transparent electrode Etr as described above (the angle of the plane of polarization in the case of the above example) and the state of the light made incident (the angle of a polarized surface in the case of the above example) have been made different from each other corresponding to the charges in the charge image.

Then, a light beam emitted from, for example, a laser light source 4 (or a light source comprised of a halogen lamp) is passed through a polarizer 5 so as to be converted to a linearly polarized light beam (the polarizer 5 may not be used when the above light source 4 is linearly polarized), and thereafter made incident on an optical deflector 6.

In the above optical deflector 6, the light beam made incident therein emerges therefrom in the state deflected in the two directions crossing at right angles, like a raster produced on a display unit in television equipment.

The light beam having emerged from the optical deflector 6 in the state as described above is converted to parallel light by means of a collimator lens 7 that makes incident rays of light emergent in the form of parallel rays of light. The beam made up of parallel rays of light is then made incident on a beam splitter 8.

The light beam made incident on and emergent from the beam splitter 8 is converged with a lens 9 and is then made incident on the reading head RH. Since the surface of the dielectric layer IL in the charge image recording medium RM in which the recorded information is stored in the form of a charge image faces the dielectric mirror DML in the reading head RA described above, an electric field attributable to the charge image recorded on the surface of the dielectric layer IL in the charge image recording medium RM is imparted to the light-modulation material layer PML in the reading device through the dielectric mirror DML described above.

Now, when the light is made incident from the transparent electrode Etr side in the reading head RH, the light made incident passes through the light-modulation material layer PML and is reflected by the dielectric mirror DML, and then the reflected light again passes through the light-modulation material layer PML and emerges from the surface of the transparent electrode Etr. Here, the polarization plane of the light having emerged from the reading head RH as described above and the polarization plane of the light made incident have been made different from each other corresponding to the charges in the charge image in the above charge image recording medium RM.

As described above, the light having emerged from the reading head RH is in the state that the amount of rotation of a plane of polarization has been changed depending on the charges of a charge image in the charge image recording medium RM in which the information recorded by the light made incident on the reading head is stored in the form of a charge image, and is also made up of parallel rays of light by means of the collimator lens 7.

Then, the light having emerged from the reading head RH is passed through the lens 9 and the beam splitter 8 and thereafter made incident on a convergence lens 10, so that the light beam converged with the convergence lens 10 is always converged at the same position.

In respect of the light converged with the convergence lens 10, a photoelectric converter 13 is disposed at the convergence point of the above convergence lens 10 through a wave-plate 11 for setting an optical bias and an analizer 12 for converting the amount of rotation of a plane of polarization to a change of brightness. Thus, a picture signal whose amplitude has been varied depending on the charges in each area of the two-dimensional charge image in the charge image recording medium RM can be obtained from the above photoelectric converter 13.

The picture signal outputted from the photoelectric converter 13 described above corresponds to the distribution of charges in the highly detailed two-dimensional charge image in the charge image recording medium RM.

When in the charge image recording medium RM of the present invention the component part at which a charge image is recorded is comprised of the light-modulation material layer PML-Q comprising a polymer-dispersed liquid crystals film comprising a liquid crystal dispersed in a polymer, the reading head RH in the recording system shown in FIG. 9 is unnecessary as previously mentioned. Since the recording system as shown in FIG. 9 is so constituted that the reflected light from the charge image recording medium RM is read, the charge image recording medium RM from which the image information is read in the state that the reading head RH has been removed should of course be constituted in the manner that the charge image recording medium RM is equipped with a reflective member (for example, a dielectric mirror) so that the light made incident on the charge image recording medium RM can travel forward and back through the light-modulation material layer PMLQ comprising a polymer-dispersed liquid crystals film, and return to the convergence lens 9.

As will be apparent from what has been described above in detail, the charge image recording medium of the present invention is in the first place a charge image recording medium comprising a lamination of at least an electrode and a light-modulation material layer, characterized in that the light-modulation material layer comprises a polymer-dispersed liquid crystals film. Thus, use of the light-modulation material at the part having the function of retaining a charge image makes a reading head unnecessary at the time of reading. In addition, even when a recording medium has any forms of a tape, a disk, a sheet and a card and also even in the case of a charge image recording medium having a large area, it is possible to readily construct the light-modulation material layer. Moreover, a polymer having a volume resistivity of not less than $10^{14} \Omega \cdot cm$ is used as the polymer in which the liquid crystal is dispersed, or a nematic liquid crystal that exhibits a liquid crystal phase at room temperature and has a volume resistivity of as high as not less than $1 \times 10^{13} \Omega \cdot cm$ is used as the liquid crystal dispersed in the polymer. This makes it possible to readily provide a charge image recording medium improved in the recording performance and resolution.

In the second place, the charge image recording medium of the present invention is a charge image recording medium comprising a lamination of at least an electrode and an insulating polymer film, wherein said insulating polymer film is provided thereon with a thin film of a fatty acid or a thin film of a metal salt of a fatty acid; and a charge image recording medium comprising a lamination of at least an electrode and a light-modulation material layer, wherein said light-modulation material layer comprises a polymer-dispersed liquid crystals film comprising a liquid crystal dispersed in a polymer, and said light-modulation material layer is provided thereon with a thin film of a fatty acid or a thin film of a metal salt of a fatty acid. The thin film of a fatty acid or the thin film of a metal salt of a fatty acid, thus provided, has a good water-repellent effect, so that a charge image formed on the thin film of a fatty acid or the thin film of a metal salt of a fatty acid can be retained over a longer period of time. The present invention can well solve the problems involved in the conventional charge image recording medium RM as previously discussed, such that the charges of a charge image recorded thereon may gradually decrease with lapse of time and it has occurred even that the charge image can is be retained only for several hours to several days or so.

What is claimed is:

1. A laminated charge recording device comprising:
   a substrate;
   an electrode having first and second surfaces wherein one of said first and second surfaces if laminated to said substrate;
   an insulating polymer film layer having first and second surfaces wherein one of said first nd second surfaces of said insulating film is laminated on the other of said first and second surfaces of said electrode and;
   a film of a fatty acid or a metal salt of a fatty acid positioned on the other of said first and second surfaces of said insulating polymer film layer.

2. A laminated charge recording device according to claim 1, wherein said insulating polymer film comprises a polymer selected from the group consisting of acetate, polypropylene, vinyl chloride, vinylidene chloride, polystyrene, polycarbonates, polyesters, ethylene tetrafluoride, polyvinyl fluoride, polyimides, ethylene/vinyl acetate copolymers, polymethyl methacrylate, acrylonitrile, styrene copolymers, polyurethanes, polyvinyl butyral, poly-4-methylpentane, epoxy resins, phenol resins, diallyl phthalate resins, silicone resins, polyvinylidene fluoride, polytrifluoroethylene, polytetrafluoroethylene, polyether imide, polysulfone, polyacrylate, isoprene rubber, styrene-butadiene rubber, butadiene rubber, ethylene-propylene rubber, butyl rubber, cellulose triacetate, acrtylbutylcellulose, ABS resins, polybutene-1, methyl methacrylate/styrene copolymers, and maleic anhydride/styrene copolymers.

3. A laminated charge recording device according to claim 1, wherein said fatty acid is selected from the group consisting of stearic acid, arachidic acid, myristic acid and pentadecyl acid.

4. A laminated charge recording device according to claim 1, wherein said metal salt is iron (III) stearate or cadmium stearate.

5. A laminated charge recording device according to claim 1, wherein said film of a fatty acid or a metal salt of a fatty acid is formed by the Langmuir-Brodgett process.

6. A laminated charge recording device comprising:
   a substrate;
   an electrode having first and second surfaces wherein one of said first and second surfaces is laminated to said substrate;
   a layer of light-modulation material having first and second surfaces wherein said one of said first and second surfaces of said layer of light-modulation material is laminated to the other of said first and second surfaces of said electrode and;
   a film of a fatty acid or a metal salt of a fatty acid laminated on the other of said first and second surfaces of said layer of the light-modulation material,
   wherein said layer of light-modulation material layer comprises a polymer having a liquid crystal material dispersed therein, and said light-modulation material layer has a volume resistivity of not less that $10^{14}\Omega\cdot cm$.

7. A laminated charge recording device according to claim 6, wherein said polymer is selected from the group consisting of methacrylic resins, polyester resins, polycarbonate resins, vinyl chloride resins, polyamide resins, polyethylene resins, polypropylene resins, polystyrene resins and silicone resins.

8. A laminated charge recording device according to claim 6, wherein said liquid crystal material is a nematic liquid crystal which exhibits a liquid crystal phase at room temperature and has a volume resistivity of not less than $10^{13}\Omega\cdot cm$.

9. A laminated charge recording device according to claim 6, wherein said fatty acid is selected from the group consisting of stearic acid, arachidic acid, myristic acid and pentadecyl acid.

10. A laminated charge recording device according to claim 6, wherein said metal salt is iron (III) stearate or cadmium stearate.

11. A laminated charge recording device according to claim 6, wherein said film of a fatty acid or a metal salt of a fatty acid is formed by the Langmuir-Brodgett process.

12. A laminated charge recording device comprising:
   a substrate;
   an electrode having first and second surfaces wherein one of said first and second surfaces is laminated to said substrate;
   a layer of a light-modulation material having first and second surfaces wherein said one of said first and second surfaces of said layer of light-modulation material is laminated to the other of said first and second surfaces of said electrode;
   an insulating polymer film layer having first and second surfaces wherein said one of said first and second surfaces of said insulating film is laminated on the other of said first and second surfaces of said layer of light-modulation material; and
   a film of a fatty acid or a metal salt of a fatty acid positioned on the other of said first and second surfaces of said insulating polymer film,
   wherein said layer of light-modulation material layer comprises a polymer having a liquid crystal material dispersed therein, and said light-modulation material layer has a volume resistivity of not less that $10^{14}\Omega\cdot cm$.

* * * * *